Patented May 23, 1933

1,910,582

UNITED STATES PATENT OFFICE

JOHAN PIETER WIBAUT, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS FOR THE MANUFACTURE OF BUTYL ALCOHOL

No Drawing. Application filed May 17, 1930, Serial No. 453,411, and in Great Britain May 28, 1929.

The invention relates to the manufacture of butyl alcohol from ethyl alcohol.

Guerbet, by heating a solution of 28.5 per cent of barium alcoholate in ethyl alcohol in a closed tube at 230–240° C. for 72 hours, obtained a small quantity of butyl alcohol (less than one per cent).

From the above it appears that Guerbet tried to obtain a molecular reaction between the said substances and that the yield of the desired reaction product, i. e. butyl alcohol, was very low.

In British Patent Specification No. 282,448 a process is described for the conversion of ethyl alcohol into butyl alcohol by circulating ethyl alcohol at ordinary pressure and at a temperature of 400–500° C. over a catalyst consisting of metal compounds, such as metal oxides, hydroxides and alcoholates. The catalyst may be for example barium oxide, magnesium oxide, lime or a manganese oxide or mixtures thereof.

According to the example given in the aforesaid specification a yield of 20 to 30% by weight of the alcohol is obtained in the form of conversion products, comprising chiefly higher alcohols such as butyl alcohol and acids or their esters, among others ethyl acetate, acetals, particularly di-ethyl-acetal, besides aldehyde and other products such as acetone. No mention is made as to the yield of butyl alcohol. While the reaction may be carried out under raised pressure, it is absolutely essential that the temperature should not be substantially below 400° C.

It has now been found that the yield of butyl alcohol is considerably increased if the aforesaid reaction is carried out under pressure (preferably high pressure) and at a temperature not exceeding 400° C. and preferably not greatly exceeding 325° C. It has been ascertained that, if the temperature is raised above 325° C., the yields of butyl alcohol become smaller.

It has also been found that the nature of the catalyst has a considerable influence on the reaction. Good results are obtained by using magnesium oxide, preferably so-called burned magnesia, or beryllium oxide. Zinc oxide, calcium oxide and copper oxide are far less active when used alone, but various mixtures of these and other metal oxides may be used successfully as catalytic masses in the above reaction. Thus for instance, very active catalysts consist of a mixture of 60 parts by weight of beryllium oxide and 40 parts by weight of copper oxide or a mixture of magnesium oxide and copper oxide or magnesium oxide and nickel oxide. The activity of these mixtures depends on the content of each of the components. A contact mass containing magnesium oxide and copper oxide should preferably contain more magnesium oxide than copper oxide. Very good results are obtained when using a mixture containing about 20% or 40% copper oxide. If desired, other substances, for instance suitable carriers, may be used when applying the catalysts according to the invention.

It may be observed that if the reaction is carried out in the presence of copper oxide or nickel oxide, said oxides are rapidly wholly or for the greater part reduced to metals. The above described mixtures which initially consist of mixtures of magnesium oxide or beryllium oxide and copper oxide or nickel oxide, however, are still very active after a longer period of use. Therefore the invention also comprises the use of mixtures of magnesium oxide or beryllium oxide together with copper or nickel.

It should be noted that according to this invention the whole reaction is carried out in the vapour phase, the temperatures used preferably lying above the critical temperature of ethyl alcohol. Therefore, although very high pressure may be applied, no ethyl alcohol in the liquid state is present during the reaction.

The following examples illustrate how the invention may be carried into effect.

1. 400 grams of anhydrous ethyl alcohol and 50 grams of dry magnesium oxide were heated for 48 hours in an autoclave with stirring, at approximately 275° C. and under about 100 atmospheres pressure.

After the treatment the reaction mass contained 107 grams of a liquid boiling above 80° C. and from an investigation of the high-boiling products it was found that a quantity of butyl alcohol corresponding to 34% of the alcohol converted had been obtained. Besides butyl alcohol, other higher alcohols are formed.

2. 320 grams of 96% ethyl alcohol were heated in an autoclave in the presence of 50 grams of commercial beryllium oxide at a temperature ranging from 240-280° C. and at a pressure of 60 to 120 atmospheres. After 8 hours the reaction-liquid contained approximately 6%, and after 16 hours 9% of normal butyl alcohol.

3. 320 grams of 96% ethyl alcohol were heated in an autoclave together with 50 grams of a catalyst consisting of 60 per cent of magnesium oxide and 40 per cent of copper oxide prepared as follows: To commercial magnesium oxide (produced by calcining magnesium carbonate) the required quantity of cupric nitrate solution was added, whereafter the mass was evaporated to dryness and then calcined and powdered.

After a treatment of 2 hours in the autoclave, in which the temperature was approximately 270° C. and the pressure amounted to 130-140 atmospheres, the reaction products contained a quantity of normal butyl alcohol corresponding to 30% of the initial ethyl alcohol, and moreover 14% of the ethyl alcohol was converted into still higher valuable alcohols.

4. 320 grams of 96% ethyl alcohol is treated in the same way as described in Example 3, but in this case in the presence of a contact mass consisting of 60% beryllium oxide and 40% copper oxide prepared by melting a mixture of the nitrates of beryllium and copper in the required proportions and calcining the melt. After a treatment of 6 hours the reaction products contained more than 7% of butyl alcohol.

5. A mixture of 90% magnesium oxide and 10% nickel oxide was prepared by precipitating a solution of magnesium chloride and nickel sulphate in the required proportions with potassium hydroxide, evaporating to dryness, and thereafter treating the mass at 300-400° C.

320 grams of 96% ethyl alcohol were heated in an autoclave at approximately 270° C. at a pressure ranging from 88-100 atmospheres in the presence of 50 grams of the catalytic mass prepared as described above. After 16 hours about 10% of the reaction products consisted of normal butyl alcohol.

It will be understood that the reaction product contains a considerable quantity of ethyl alcohol, which is not converted and may be used again in the process for the further conversion into butyl alcohol.

A very important feature of the catalysts described is that their activity does not diminish after repeated employment. It will be clear that it is possible to carry out the process according to the invention continuously by passing ethyl alcohol vapours under pressure over the active contact masses described, separating butyl alcohol and higher alcohols from the reaction liquid by fractional distillation or in some other suitable manner and using the unconverted ethyl alcohol again in the process for a further conversion into butyl alcohol.

If the reaction temperature is raised to 325° C. at a pressure of for example 200-300 atmospheres, the yield of butyl alcohol is considerably increased.

Having now particularly described and ascertained the nature of my said invention and in what manner the same is to be performed, I declare that what I claim is:—

1. The process of manufacturing butyl alcohol and higher alcohols from ethyl alcohol, which comprises heating ethyl alcohol vapors under pressure to a temperature not exceeding 400° C. in the presence of a catalyst comprising 20-40 per cent by weight of copper oxide and 80-60 per cent by weight of magnesium oxide.

2. A process as set forth in claim 1, wherein the temperature is below 325° C.

In testimony whereof, I have affixed my signature.

JOHAN PIETER WIBAUT.